Jan. 21, 1964
J. W. WHITE
3,118,958
APPARATUS FOR MAKING CELLULAR PRODUCTS
Original Filed May 6, 1957
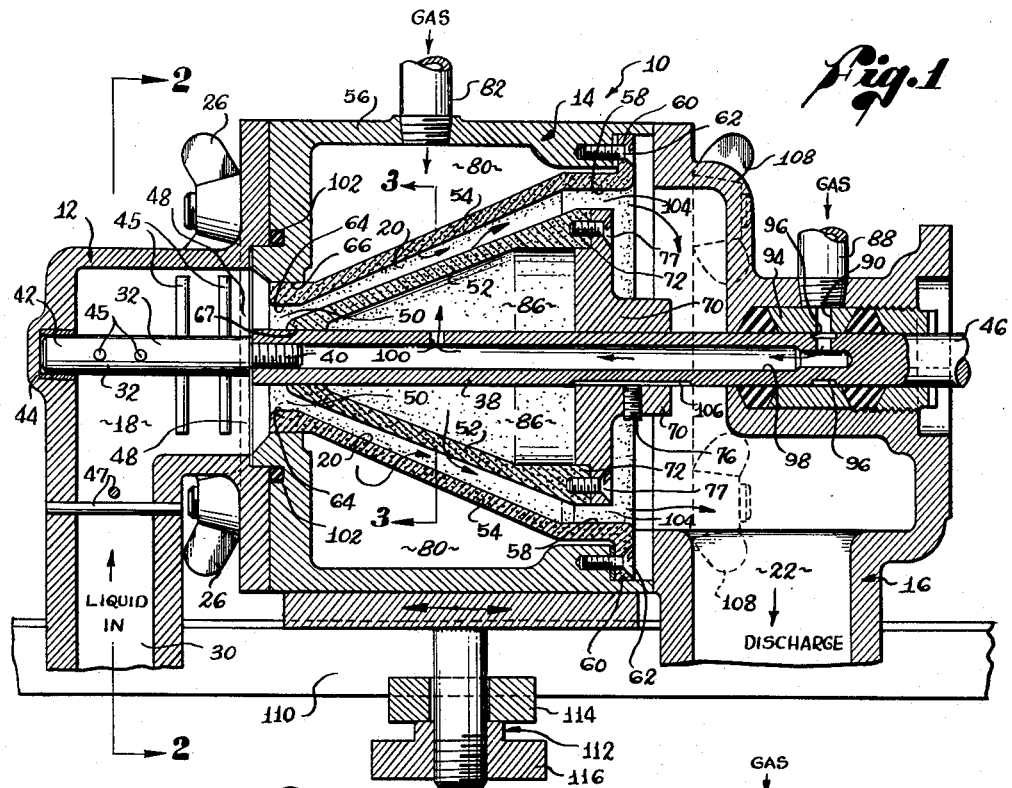
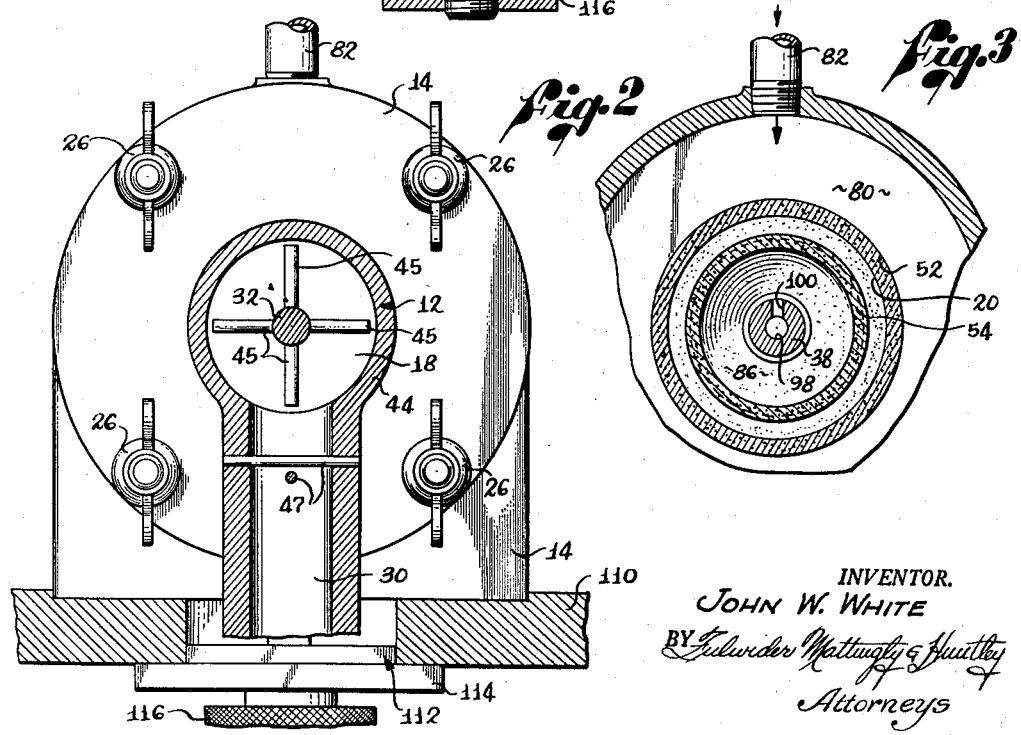
INVENTOR.
JOHN W. WHITE United States Patent Office 3,118,958
Patented Jan. 21, 1964

3,118,958
APPARATUS FOR MAKING CELLULAR PRODUCTS
John W. White, North Hollywood, Calif., assignor to Mildred M. Kelly, Los Angeles, Calif.
Continuation of application Ser. No. 657,370, May 6, 1957. This application Feb. 10, 1960, Ser. No. 10,531
6 Claims. (Cl. 261—87)

This invention relates generally to apparatus for making cellular products, and more particularly relates to apparatus for continuously aerating or foaming of liquids such as rubber latex dispersions.

In the production of foam rubber, it has been the practice to foam the rubber latex dispersion by beating or whipping air into it, or in some instances, to inject air into the liquid by means of a plurality of hypodermic needles. These methods are reasonably satisfactory in batch operations, but are not practical in a continuous process.

It has also been proposed to provide, in apparatus adapted for continuous foam rubber processing, a means for injecting gas into the rubber latex in extremely minute and uniform manner which comprises the passage of gas under pressure through a micro-porous plate or wall having extremely small pores, of the order of 5 microns, as the rubber latex passes in intimate contact over the porous plate. In this manner, a finer and more homogenous cell structure is produced in the foam rubber product. While the apparatus just described is highly advantageous and superior to the other methods for continuously foaming latex, some difficulty has been experienced because of the build-up of latex, after some hours of operation, on the porous plate, thereby preventing the discharge of gas into the passing latex. In such cases, the machine must be disassembled and cleaned—or a new plate or wall employed. In any event, a loss of production results while the machine is being disassembled.

Bearing in mind the foregoing facts, it is a major object of the present invention to provide an improved apparatus for the continuous production of cellular products, particularly foam rubber and other cellular rubber products.

Bearing in mind the foregoing facts, it is a major object of the present invention to provide an improved apparatus for the continuous production of cellular products, particularly foam rubber and other cellular rubber products.

Another object of the present invention is to provide improved apparatus for the continuous production of cellular products which incorporates a micro-porous plate through which a gas is passed in uniform and fine amounts into the material to be foamed, and in which build-up of the material on the porous plate is minimized.

It is a further object of the present invention to provide apparatus of the character described which reduces the amount of material build-up on a porous plate to a minimum by equalizing the pressure in the material as the material volume expands due to foaming, while still maintaining the material in intimate contact with the porous plate as it is foamed.

Still another object of the present invention is to provide an apparatus of the character described wherein liquid material may be introduced, mixed and aerated within an extremely small volume, and on a continuous basis.

It is also an object of the present invention to provide apparatus of the character described wherein an improved means for ready disassembly of the apparatus during cleaning is provided, thereby minimizing loss of production time.

The stated and other objects and advantages of this invention will be apparent from the following description of a preferred form thereof, and from the accompanying drawings, in which:

FIGURE 1 is a vertical longitudinal section of the mixing and foaming apparatus;
FIGURE 2 is a sectional view taken along the line 2—2 of FIGURE 1; and
FIGURE 3 is a sectional view taken along the line 3—3 of FIGURE 1.

Referring now generally to the drawings, the apparatus of my invention is designated by the numeral 10 and comprises, at the left end thereof, a mixing section 12, a foaming section 14 in the central portion thereof, and a discharge section 16 at the right end thereof. The liquid to be foamed, for example, a latex dispersion, enters the mixing section 12 and passes through a mixing chamber 18 contained therein. The liquid then enters a narrow, conical, progressively enlarging passageway 20 provided in the foaming chamber or section 14. A gas, such as air, is injected into the passageway 20 through each of the porous walls defining the passageway 20, thus uniformly aerating the material. The aerated material is then discharged into a discharge chamber 22 formed within the discharge section 16 and leaves the apparatus 10 to be sent to molds for curing, or to other process steps, depending upon the particular liquid involved.

Referring now specifically to FIGURE 1, the mixing section 12 is removably connected to the foaming section 14 by any suitable means, such as by the wing nut and bolt construction 26. The mixing chamber 18 is provided with an inlet passage 30.

In foam rubber production, the latex feed comprises a variety of ingredients, such as a stabilizer, gelling agent, plasticizer and the like, some of which are added just prior to the foaming operation. A specific process for which my apparatus is particularly well suited is described and claimed in Patent No. 2,885,372 issued May 5, 1959 to John Hugh Kelly, Jr. In this process, a plurality of dissimilar latex dispersions, one of which contains the gelling agent, are intermixed just prior to the foaming operation, the mixing operation being advantageously conducted in the mixing chamber 18 to be now described.

The mixing chamber 18 is generally cylindrical in shape and is provided with a rotary shaft 32 extending axially therethrough, one end of which is affixed to a second axially aligned shaft 38, in any suitable manner, as by a screw connection 40. The opposite end 42 of the shaft 32 is mounted in a bearing within the housing 44 of the mixing chamber 18. The shaft 32 has affixed thereto a plurality of radially extending rods or padding 45 which are spaced about its periphery and extend over the length of the shaft.

The right end 46 of the shaft 38 is adapted to be connected to a source of power (not shown). The shaft 32 is thus rotatable with the rotation of the shaft 38, thereby enabling the mixing paddles 45 to thoroughly mix liquid material entering the chamber 18. The mixing is further aided by the provision of turbulence-creating rods 47 mounted across inlet passage 30.

Measured amounts of liquids are fed to line 30 under substantial pressure so that they will readily travel through the mixing chamber 18 and into the foaming section 14. The liquid, after being thoroughly mixed in the chamber 18, as above described, passes from the outlet end 48 thereof and into the narrow annular mouth or inlet 50 of the conical passageway 20 mounted in the foaming section 14.

The inner and outer walls 52, 54, respectively, which define the conical passage 20 are shaped in the form of a male and female conic member or section, respectively, each member being made of a porous material having a mean pore diameter of the order of from 5 to 65 microns. The raw material preferably used is stainless steel powder of uniform particle size heat-treated to form a strong sheet of any desired shape.

The outer female porous conical member 54 is affixed to the housing 56 of the foaming section 14 by any appropriate means. For example, the larger open end 58 of the member 54 is provided with an outwardly directed annular flange 60 which is connected to the housing 56 by means of a plurality of screws 62. The smaller circular open end 64 of the conical member 54 is press fitted within a complementary side opening 66 in the housing 56, and defines the outer surface of the mouth 50 of the passageway 20.

The male conical member 52, which defines the inner wall of the passage 20, is formed with an open smaller end 67 which is slidably fitted onto the rotatable shaft 38. The member 52 is adapted to rotate with the shaft 38 by means of a mounting sleeve 70 as follows: the mounting sleeve 70 is first mounted on the shaft 38 by means of an adjusting flat-head screw 76, the mounting sleeve being in turn affixed to the larger end 72, of the conical member 52 by screw connections 77.

As the liquid to be foamed enters the conical passage 20 from the mixing chamber 18, the liquid is restricted between the walls 52, 54 of the passage so as to be in intimate contact therewith. A multiplicity of microscopic gaseous blasts is then forced into the passing liquid through both porous walls 52 and 54 to thoroughly and uniformly foam the liquid.

The gas, forced through the female porous conic section 54, is injected from a gas chamber 80, the walls of which are defined by the housing 56 of the foaming section 14 and the porous wall 54 itself, the chamber 80 being fed by gas entering a gas inlet conduit 82 under pressure.

The gas, forced through the male porous conic section 52, is injected from a second gas chamber 86, the walls of which are defined by the inner surface of the conic section 52, the inner surface of the mounting sleeve 70, and the outer surface of the shaft 38. The gas chamber 86 is fed by gas entering a gas inlet conduit 88 mounted within discharge chamber 22, the gas passing from the conduit 88 through a passage 90 formed in the shaft bearing member 94, thence through an annular groove 96, formed on the periphery of the rotary shaft 38, and transversely aligned with the passage 90, to an elongated gas passage 98 formed within the rotatable shaft 38. (It will be noted that the gas passage 98 is closed at its left end by the threaded end 40 of shaft 32.) The gas then passes from the elongated gas passage 28 into the chamber 86 through a transverse port 100. The gas entering inlet conduit 88 is preferably maintained at approximately the same pressure as the gas entering inlet 82.

It will be seen that gas entering the conduit 88 will enter the elongated gas passage 98 regardless of the angular position of the rotary shaft 38, inasmuch as the annular groove 96 is in constant communication with the conduit 88 regardless of the relative angular position of the shaft 38. Also it will be seen that the port 100 is always in communication with the chamber 86 regardless of the angular position of the rotatable shaft 38 with respect thereto. In this manner, the rotary porous member 52 will always have a continuous supply of gas being forced therethrough.

The porous member 52 is made rotatable in order to insure uniform dispersion of the multiplicity of minute air jets or streams issuing into the passage 20 during movement of material therethrough. The relative rotation of the conical members 52, 54 facilitates movement of the liquid toward the discharge section 16 and tends to equalize the flow across all parts of the conical passage 20. The speed of relative rotation of the conical members 52, 54 ranges preferably between 100 and 400 r.p.m.

The presence of two gas chambers 80, 86 is sufficient, in some instances, to distribute, and force, the gas through the entire surface of the porous walls 52, 54 to obtain a uniform foaming of the liquid passing through the passage 20 without the need for relative rotation of the porous walls, as just described. It will be noted that a bearing seal 102 is provided at the juncture of the mixing and foaming sections 12 and 14 to minimize leakage of gas from the apparatus 10.

The problem faced by the prior art of the build-up of material upon the walls of the foaming passage, particularly when foaming rubber base liquids, is, to a large extent, overcome by the use of the pair of conical porous members of the type described. As the latex passes through the foaming passage, the foaming thereof considerably increases its volume. If the passage is designed so as to be progressively enlarged in proportion to the increase in volume of the liquid due to the foaming, the pressure upon the porous walls of the passage becomes substantially equalized and build-up of the liquid upon the porous passage walls, with consequent clogging of pores of the walls, is prevented or substantially reduced.

It will be seen that, by providing a progressively widening passageway 20, the volume increase of the passage 20 from its inlet end 56 to its outlet end 104 can be made to increase in proportion to the increase in volume of the liquid passing therethrough due to the foaming. For example, if the volume increase due to foaming is eight-fold from inlet 50 to outlet 104, increase in volume of the passage from the inlet to the outlet would be also made eightfold.

The exact amount of volume increase desired in the passage 20 is obtained by choosing the conic section having the proper taper and length. The taper of each conical section 52, 54 is generally the same, but can be dissimilar when desired. If the width of the conical passage 20 does diverge from inlet 50 to outlet 104, an additional volume increase in the passage is thereby provided.

Adjustment means for the passage width is required so that exact passage widths may be provided whereby the liquid mixture is forced to flow in intimate contact with the adjacent faces of porous walls 54 and 52, while it is subjected to a multiplicity of air streams emerging therefrom. To this end, the flat-head screws 76 mounted in the mounting sleeve 70 are adapted to engage an elongated, flat-bottomed groove or depression 106 formed within the periphery of the shaft 38. Upon loosening the adjusting screw 76, the mounting sleeve 70 and the male conic member 52 are movable in the direction desired to form an appropriately sized passage 20. The conic member 52 is then stably positioned by tightening screw 76 until it abuts the bottom of the groove 106.

After complete foaming of the liquid, as described, the foamed liquid is discharged from the outlet end 104 of the passage 20 into the discharge chamber 22 of discharge section 16. The discharge section 16 is mounted to the foaming section 14 by any suitable means allowing quick disassembly, such as by a wing nut and bolt construction 108. The shaft 38 extends through the discharge section 16 and is rotatably mounted within the bearing 94, the right end 46 of the shaft being adapted to be connected to a source of power, as previously mentioned. The discharge section 16 is affixed to a suitable fixed base (not shown).

Inasmuch as the size of the gas bubbles in the foamed material depends to some extent upon the back pressure in the foaming chamber 14, the discharge chamber is preferably provided with a variable area discharge, as, for example, by the use of a discharge plate (not shown) covering the discharge end (not shown) and having a variable opening formed therein.

The foamed liquid then passes from the discharge chamber 22 and is usually sent to molds for curing, or to other process steps, depending upon the particular liquid involved.

In the operation of the apparatus in the continuous production of foam rubber, measured amounts of latices are continuously introduced into the inlet passage 30. The latices are thoroughly intermixed by the rotation of paddles 45. The mixture then passes into the inlet end 50 of the conical passage 20 and is spread over the entire surface of the passage walls 52, 54, aided by the rotation of the conical member 52. As the mixture passes through the conical passage 20, it is thoroughly foamed by a multiplicity of extremely fine air blasts issuing from both sides of the passage 20 through the porous walls 52, 54. The extent of build-up on the porous walls of latex is minimized by provision of a progressively increasing volume per unit length of passage 20, the passage volume increasing in proportion to the rate of increase in volume of the latex as it moves through the passage 20.

In accordance with the process of said Patent No. 2,885,372 issued to John Hugh Kelly, Jr., one of the latices will have therein a gelling agent adapted to initiate gelling of the other latex and the timing of the apparatus will therefore be such that complete intermixing and foaming are had and the mixture discharged from the apparatus 10, before noticeable gelling takes place. It will be readily appreciated that by the apparatus herein shown, all the variables of the process can be readily and accurately controlled without complex auxiliary equipment.

The apparatus 10 has been designed for rapid disassembly whereby access to the vital parts of the apparatus is quickly provided. For this purpose, the housing 56 of the foaming section 14 is adapted to slide on a rail base 110. In disassembling the apparatus 10, the wing nuts 26 and 108 which affix the mixing section 12 and the discharge section 16 to the foaming section 14, respectively, are first removed. The housing 44 of the mixing section 12 is then taken away, and the mixing paddles 45 are removed by merely unscrewing the threaded end 40 of the shaft 32 from the shaft 38.

The foaming section 14, during operation of the apparatus 10, is clamped to the rail base 110 by clamping means 112 which consists, for example, of a clamping plate 114 adapted to be loosened and tightened by a knurled nut 116 to thereby lock and unlock the foaming section onto the rail base. After unlocking the clamping means 112, the foaming section 14 is then slidably moved to the left away from the discharge section 16, thus completely separating the two conical sections 54, 52 so that each may be completely cleaned or replaced, as desired. While housings of the various sections are separated, adjustment of the conical passage 20 can be made by axial movement of the conic member 52, as described previously.

In assembling the apparatus, the paddles 45 are attached to the shaft 32 and the sections 12, 14 and 16 affixed to each other. The clamping means 112 is then tightened to lock foaming section 14 in place, and the apparatus is ready for operation. The various air inlet and liquid inlet lines are, of course, flexible to accommodate the movement of the mixing and foaming sections 12, 14 during assembly and disassembly.

This patent application is a continuation of my co-pending patent application Serial No. 657,370 filed May 6, 1957 for Apparatus for Making Cellular Products, and now abandoned.

While the apparatus herein shown and described has been described particularly with respect to several embodiments, it will be apparent that substantial changes and modifications can be made within the spirit of the invention. Therefore, I do not intend to be limited by the embodiment herein shown and described, but only by the appended claims.

I claim:

1. Apparatus for foaming materials which comprises:
   a housing;
   a shaft rotatably mounted within said housing;
   means to rotate said shaft;
   a first hollow, porous conic section coaxially mounted onto said rotatable shaft, the inner surface of said first conic section and the wall of said rotatable shaft defining a first gas chamber;
   a second hollow, porous conic section affixed to said housing, said first conic section being coaxially disposed within said second conic section, said second conic section surrounding said first conic section in closely spaced relationship therewith, and said first and second conic sections having their projected apexes located at the same end to form a continually diverging conic passageway therebetween, said second conic section and said housnig defining a second gas chamber;
   means for supplying gas under pressure into said gas chambers, whereby said gas is forced through said porous conic sections into said conic passageway in the form of a multiplicity of gaseous blasts;
   and means for conducting foamable material into and through said conic passageway whereby said material is subjected to said gaseous blasts to thereby uniformly and completely foam said material.

2. Apparatus according to claim 1 wherein means are provided for slidably moving said housing and said second conic section away from said first conic section to facilitate cleaning.

3. Apparatus of the character described which includes:
   a mixing chamber having an outlet end and an inlet end;
   a foaming chamber adjacent said mixing chamber having an inlet and an outlet end, said inlet end of said foaming chamber communicating directly with the outlet end of said mixing chamber;
   a shaft extending through both said mixing chamber and said foaming chamber;
   liquid agitating means affixed to a portion of the shaft within said mixing chamber;
   means to rotatably mount said shaft within said chambers;
   means to rotate said shaft;
   a first porous, conic wall mounted on said shaft, in said foaming chamber, to rotate therewith;
   a second porous, conic wall surrounding said first conic wall in closely spaced relationship therewith, said first conic wall being coaxially disposed within said second conic wall, and said first and second conic walls having their projected apexes located at the same end to form a conic passage continually diverging from said inlet end of said foaming chamber to said outlet end of said foaming chamber;
   means for directing gas under pressure through both of said porous conic walls and into said conic passage;
   and means for conducting foamable material from said mixing chamber to said conic passage whereby said material is subjected to a multiplicity of minute gaseous blasts to foam the same upon movement of the material thereacross.

4. Apparatus according to claim 3 characterized in that a portion of said rotatable shaft upon which said agitation means is affixed has means to threadably connect said portion to the remaining portion of said rotatable shaft for ready removability of said agitation means.

5. Apparatus of the character described which includes:
   means defining a mixing chamber and an adjacent foaming chamber;
   passage means connecting said chambers;
   a shaft extending from said mixing chamber, through said passage means, and into said foaming chamber;
   means to rotatably mount said shaft;
   means to rotate said rotatably mounted shaft;
   radial beater elements mounted on that portion of said shaft lying within said mixing chamber;
   a first porous, conic section, having an inner surface and an outer surface, coaxially mounted onto said shaft in said foaming chamber;

means for adjusting the location of said first conic section on said shaft;

a second porous conic section affixed within said foaming chamber, said first conic section being coaxially disposed within said second conic section, said second conic section surrounding said first conic section in closely spaced relationship therewith and said first and second conic sections having their projected apexes located at the same end to form a continuously diverging conical passageway, in said foaming chamber, having its smaller inlet end in direct communication with said passage means;

means for directing gas under pressure through each of said conic sections and into said conical passageway in the form of a multiplicity of fine air jets;

means for supplying controlled amounts of foamable material to said mixing chamber under pressure sufficient to cause them to flow into said foaming chamber and into said conical passageway whereby as said material flows through said conical passageway it is foamed by said air blasts;

and means forming a chamber for receiving said foamed material, said chamber having a discharge port.

6. Apparatus for foaming material which includes:

a mixing chamber having an inlet and an outlet for receiving and discharging foamable material;

a housing defining a foaming chamber having an inlet and an outlet, the inlet of said foaming chamber being in communication with the outlet of said mixing chamber;

a shaft passing through both of said chambers and provided with means for agitating the material in said mixing chamber;

means for rotatably mounting said shaft;

means for rotating said rotatably mounted shaft;

a first conic section composed of porous material, the mean pore diameter of said porous material lying between 5-65 microns, said first conic section being affixed to said shaft, within said foaming chamber, for rotation with said shaft;

a second porous conic section mounted on said housing, said second conic section surrounding said first conic section in closely spaced relationship therewith, said first conic section being coaxially disposed within said second conic section, and said first and second conic sections having their projected apexes located at the same end to form a continuously diverging conical passageway having its smaller inlet end in communication with said outlet of said mixing chamber;

a first gas receiving chamber defined by said first conic section and said shaft in said foaming chamber;

a second gas receiving chamber defined by said second conic section and said housing;

means for directing gas, through each of said gas receiving chambers, under pressure, said gas passing from said gas receiving chambers through said porous conic sections and into said conical passageway as a multiplicity of fine air streams;

means for supplying controlled amounts of foamable material to said mixing chamber under a pressure sufficient to cause them to flow from said mixing chamber into said foaming chamber and through said conical passageway, said multiplicity of gas streams uniformly foaming said material as it flows through said conic passageway;

and means for slidably moving said housing and said second conic section of said foaming chamber away from said first conic section to facilitate cleaning.

References Cited in the file of this patent
UNITED STATES PATENTS

| | | |
|---|---|---|
| 1,971,852 | Goebels | Aug. 28, 1934 |
| 2,559,164 | McAllister | July 3, 1951 |
| 2,658,736 | Alderfer | Nov. 10, 1953 |
| 2,791,404 | Kelly et al. | May 7, 1957 |
| 2,825,413 | Williams | Mar. 4, 1958 |

FOREIGN PATENTS

| | | |
|---|---|---|
| 694,918 | Great Britain | July 29, 1953 |